United States Patent
Dairoku et al.

(10) Patent No.: US 7,347,330 B2
(45) Date of Patent: Mar. 25, 2008

(54) METHOD FOR SIZING OF WATER-ABSORBENT RESIN

(75) Inventors: Yorimichi Dairoku, Himeji (JP); Kozo Nogi, Kakogawa (JP); Koji Miyake, Okayama (JP)

(73) Assignee: Nippon Shokubai Co., Ltd., Osaka (JP)

( * ) Notice: Subject to any disclaimer, the term of this patent is extended or adjusted under 35 U.S.C. 154(b) by 257 days.

(21) Appl. No.: 10/855,251

(22) Filed: May 27, 2004

(65) Prior Publication Data

US 2004/0242761 A1 Dec. 2, 2004

(30) Foreign Application Priority Data

May 27, 2003 (JP) .............................. 2003-149483

(51) Int. Cl.
*B01J 20/26* (2006.01)
*B02C 19/00* (2006.01)
*B07B 13/02* (2006.01)
*C08F 6/04* (2006.01)
*C08F 20/06* (2006.01)

(52) U.S. Cl. ................. 209/509; 525/329.7; 525/330.1

(58) Field of Classification Search ................ 209/509; 525/329.7, 330.1
See application file for complete search history.

(56) References Cited

U.S. PATENT DOCUMENTS

| | | | |
|---|---|---|---|
| 3,661,815 A | 5/1972 | Smith | 260/17.4 |
| 4,076,663 A | 2/1978 | Masuda et al. | 260/17.4 |
| 4,857,610 A | 8/1989 | Chmelier et al. | 526/88 |
| 5,140,076 A | 8/1992 | Hatsuda et al. | 525/375 |
| 5,250,640 A | 10/1993 | Irie et al. | 526/88 |
| 5,837,789 A | 11/1998 | Stockhausen et al. | 526/310 |
| 6,071,976 A | 6/2000 | Dairoku et al. | 521/50 |
| 6,133,193 A | 10/2000 | Kajikawa et al. | 502/402 |
| 6,228,930 B1 | 5/2001 | Dairoku et al. | 524/500 |
| 6,254,990 B1 | 7/2001 | Ishizaki et al. | 428/402 |
| 6,291,636 B1 | 9/2001 | Miyake et al. | 528/502 |
| 6,300,423 B1 | 10/2001 | Engelhardt et al. | 525/381 |
| 6,565,768 B1 | 5/2003 | Dentler et al. | 252/194 |
| 6,720,389 B2 | 4/2004 | Hatsuda et al. | 525/330.1 |
| 2001/0025093 A1 * | 9/2001 | Ishizaki et al. | 526/210 |
| 2002/0040095 A1 | 4/2002 | Dairoku et al. | 524/832 |
| 2003/0020199 A1 | 1/2003 | Kajikawa et al. | |
| 2003/0066458 A1 | 4/2003 | Emery et al. | |

FOREIGN PATENT DOCUMENTS

| | | |
|---|---|---|
| CN | 1286718 A | 3/2001 |
| EP | 0 505 163 | 9/1992 |
| JP | 52-014689 | 2/1977 |
| JP | 53-15959 | 5/1978 |
| JP | 55-084304 | 6/1980 |
| JP | 06-041319 | 2/1994 |
| JP | 10-182750 | 7/1998 |
| JP | 11-267500 | 10/1999 |
| JP | 11-349625 | 12/1999 |

* cited by examiner

*Primary Examiner*—Kelechi C. Egwim
(74) *Attorney, Agent, or Firm*—Occhiuti Rohlicek & Tsao LLP

(57) ABSTRACT

A method for sizing a surface cross-linked water-absorbent resin removed coarse particles and fine powder is provided. Sized resin particles are obtained by classifying water-absorbent resin particles to remove an aggregates and fine powder in the particles, disintegrating the obtained aggregates and classifying the products of the disintegration to remove coarse particles and fine powder contained in the products.

10 Claims, 1 Drawing Sheet

METHOD FOR SIZING OF WATER-ABSORBENT RESIN

BACKGROUND OF THE INVENTION

1. Field of the Invention

This invention relates to a method for sizing of particles of a water-absorbent resin having a surface cross-linked layer, and more particularly to a method for producing a water-absorbent resin which is destitute of fine powder and coarse particles.

2. Description of the Related Art

The water-absorbent resin possesses a characteristic property of absorbing a large volume of water and is used as materials for forming such sanitary articles as disposable diapers, sanitary napkins, and incontinence pads, water retaining agent for soil, and drip sheets for foodstuffs. Particularly, for use as such sanitary articles as disposal diapers, a water-absorbent resin manifesting a high absorption capacity under pressure is sought preferably owing to reduce the thickness.

When such a water-absorbent resin having a particle size exceeding 850 μm is used for a disposable diaper, it emits a coarse touch and degrades the sensation to the user's skin. The resin is deprived of such coarse particles by classification before it is manufactured into the product. Further, it is generally held that the water-absorbent resin is preferred to have as small a content of particulates of not more than 150 μm as permissible. The fine powder degrades the ability to pass liquid in the products and causes a leakage of the liquid in the use of the products.

As a means to obtain a water-absorbent resin having a small content of fine power, the method which classifies a water-absorbent resin prior to subjecting it to surface cross-linkage and removes the fine powder in advance has been known. The method is removing the fine powder not larger than 150 μm by classification, mixing the residual with a surface cross-linking agent and thereafter heating them, thereby obtaining a water-absorbent resin having a surface cross-linked layer. In spite of the preliminary removal of the fine powder, the end product still contains fine powder.

As a means to produce a water-absorbent resin having a small content of fine powder and excelling the absorption capacity under pressure, a method which comprises a step of adding a dried powder of water-absorbent resin and a cross-linking agent together, and a step of pulverizing the resultant mixture during cross-linking the surface region of particles while using coarse particles of water-absorbent resinmeasuring 600-1000 μm has been known (JP-A-1999-302391). This method is supposed to obtain an absorbent having a small content of fine powder and manifesting a high absorption capacity under pressure and a satisfactory ability to pass liquid under pressure by using a water-absorbent resin of a large particle diameter instead of a water-absorbent resin of a small particle diameter which is liable to form glob of swollen gel, and cross-linking the surface region of the resin during pulverizing at least part of the resin particles. Mixing devices which are usable for effecting the surface cross-linkage and the pulverization include a cylindrical mixing device, a double-wall conical mixing device, a V-shaped mixing device, a ribbon type mixing device, a meat chopper, and a rotary mixing device, for example.

One known method effects surface cross-linkage of a water-absorbent resin by using a horizontal stirring and drying device, a rotary drying device, a disk drying device, a fluidized-bed drying device, a ventilation drying device, or an infrared ray drying device at a temperature in the range of 90-250° C. (JP-A-1992-214734). As a means to perform a covalent bond type surface cross-linkage on a dried finely pulverized hydrated polymer, a method which comprises injecting an aqueous solution containing a surface cross-linking agent into a Lödige type mixing device and mixing it over a period of 5-10 minutes, then heating the resultant mixture, and cooling to afford a product is described (Example 7, JP-A-2002-527547). In this example, however, since the product was classified to a particles size traction of 120-850 μm, an aggregate was formed.

Another known method comprises preparing an internal cross-linked polymer having particle diameters adjusted by screening in the range of 150-850 μm, adding this polymer to a surface cross-linking agent, and heating the resultant mixture by the use of a paddle mixer to effect surface cross-linkage (The official gazette of International Unexamined Patent Publication JP-2002-515079). For this example sieving of a product was carried out at 850 μm and, consequently, an aggregate was formed.

The conventional methods for producing the water-absorbent resins were that even when a disintegrating step and a classifying step had been incorporated prior to surface cross-linkage, the obtained surface cross-linked water-absorbent resin contained coarse particles and that when the resin had been deprived of such coarse particles by classification, the separated coarse particles were discarded as useless. The present invention is directed at providing a method for producing a water-absorbent resin destitute of fine powder and coarse particles while sparingly inducing formation of fine powder from disintegrating.

SUMMARY OF THE INVENTION

The water-absorbent resin is produced through steps of disintegrating, drying, pulverizing, classifying, and surface cross-linking a hydrated polymer. The pulverization of the water-absorbent resin prior to the surface cross-linkage is carried out by means of a shaking mill, a roll granulater (Paragraph 0174, JP-A-1997-235378), a knuckle type pulverizer, a roll mill (Paragraph 0069, the official gazette of International Unexamined Patent Publication JP-2002-527547), a high speed rotary pulverizer (pin mill, hammer mill, screw mill, or roll mill) (Paragraph 0036, JP-A-1994-41319), or a cylindrical mixer (Paragraph 0008, JP-A-1993-202199), i.e. an apparatus suitable for the pulverization of a dried water-absorbent resin.

The present inventor, however, has found that even when the water-absorbent resin classified in advance is subjected to a treatment for surface cross-linkage, the heating treatment performed for the surface cross-linkage causes the individual particles of the water-absorbent resin to produce an aggregate, that this aggregate forms fine powder when it is disintegrated, and that the product consequently contains coarse particles and fine powder. Meanwhile, the coarse particles have been wholly discarded as useless in the belief that the coarse particles, when disintegrated, have the surface thereof degraded and decrease the absorption capacity under pressure. Also in this point, the inventor has found that the choice of a method of disintegrating allows an extreme decrease in the amount of fine powder to be formed and precludes degradation of the absorption properties of the produced water-absorbent resin. This invention perfected on the basis of this knowledge provides a very useful method in respect that it allows coarse particles to be effectively recovered and put to use, enhances the yield, and decreases the loss encountered in the disposal of useless remnant.

According to this invention, by sizing the water-absorbent resin having a surface cross-linked layer on a water-absorbent resin and excelling in absorption properties is produced.

According to this invention, the possibility of an aggregate being transformed by disintegrating into fine powder can be suppressed because the disintegration is carried out under moderate conditions.

Since the water-absorbent resin of this invention has been deprived of fine powder, the produced water-absorbent resin incurs no segregation and the disposable diaper using it does not suffer from very large dispersion of quality. This water-absorbent resin proves advantageous from the viewpoint of labor safety because it can prevent the production of disposable diapers using the resin from encountering a trouble.

DESCRIPTION OF THE PREFERRED EMBODIMENT

Figure 1:
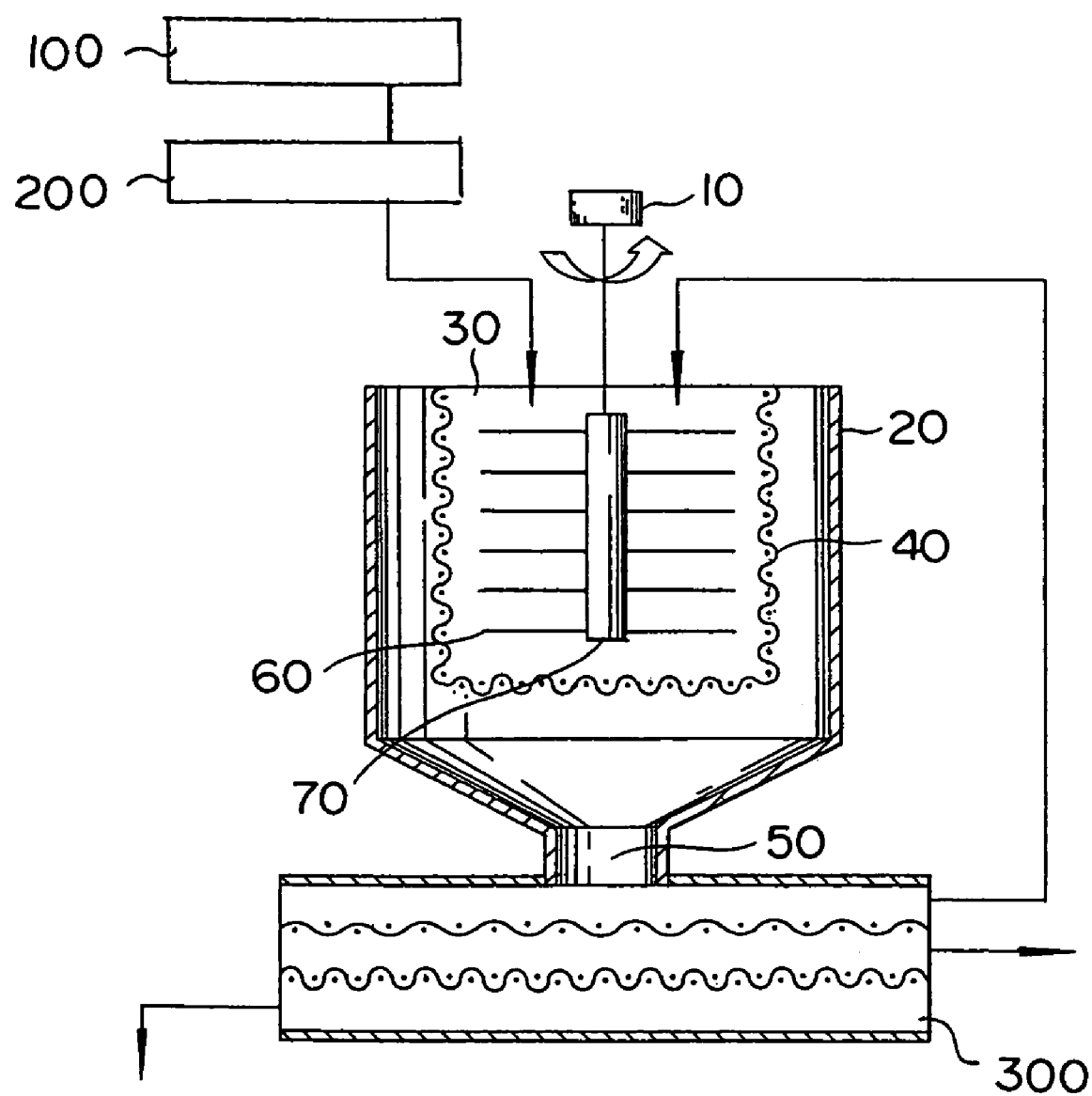
FIG. 1 is a type section illustrating one example of a knife cutter type disintegrating device which can be favorably used in the method of sizing contemplated by this invention. This example depicts a procedure which comprises disintegrating the water-absorbent resin after cooling and subsequently classifying the product of disintegrating.

The first aspect of this invention is directed toward a method for sizing of a water-absorbent resin, which comprises, in particles of water-absorbent resin having a surface cross-linked layer produced by cross-linking on a surface of a water-absorbent resin precursor which is obtained by polymerizing at least an acrylic acid and a salt thereof and has an internal cross-linked structure in the precursor, a) a step of obtaining sized water-absorbent resin particles by removing aggregates and fine powder from said water-absorbent resin particles by classifying them, and b) a step of combining said sized water-absorbent resin particles of the step a) and a water-absorbent resin particles produced by removing non-disintegrated coarse particles and fine powder by classifying after disintegrating said aggregates removed at the step a).

When the water-absorbent resin precursor is subjected to surface cross-linkage, primary particles of water-absorbent resin having a surface cross-linked layer and aggregates resulting from collection of a plurality of primary particles are formed. When the surface cross-linkage is carried out in a stirred state as described below, the surface of the water-absorbent resin precursor is exposed to mechanical attrition and caused to form fine powder. This invention contemplates separating the inherently contained aggregates and the fine powder formed during the surface cross-linking, removing the coarse particles (aggregates) and the fine powder by classification, and thereby obtaining a sized water-absorbent resin particles, and disintegrating the non-disintegrated coarse particles (aggregates) and classification again to prepare sized water-absorbent resin particles having an average particle diameter optimum for use. The term "sized water-absorbent resin particles" as used in this invention means water-absorbent resin composed by sized particles in the particle diameter aimed at and the term "water-absorbent resin" means a mixture of a sized water-absorbent resin particles, coarse particles (aggregates) and/or fine powder. The removal of the coarse particles (aggregates) and/or the fine powder from the water-absorbent resin, therefore, possibly results in forming the sized water-absorbent resin particles.

Now, this invention will be described in detail below.

The method of sizing according to this invention is to classify particles of a water-absorbent resin obtained by a surface cross-linking treatment. The operation of this classification itself can be carried out by using any of well-known dry classifying devices. The devices usable for the classification include a bolting device for dividing particles with a sifting mesh into fine particles passing the mesh and coarse particles stopped by the mesh, a gravitational classifying device for classifying particles into coarse particles and fine powder by virtue of the difference between a falling speed and a rising speed caused as by horizontal flow or ascending flow, a centrifugal classifying device by dint of sedimentation of particles in the field of centrifugal force, and an inertial classifying device for classifying particles by suddenly changing the direction of an air stream containing the particles thereby expelling particles of large inertia from the line of flow, for example.

The particle diameter which is used for the classification may be properly selected to suit the purpose for which the absorbed resin is used. When the water-absorbent resin is used for such hygienic products as disposable diapers and sanitary articles, the lower limit of the particle diameter is 100 μm and preferably 150 μm. If the particle diameter falls short of 100 μm, the shortage will possibly result in degrading the ability of the diaper to pass liquid and inducing clogging in the production line of diapers. Incidentally, for the purpose of separating fine particles having a particle diameter of not more than 150 μm, it is permissible to use a sifter having a mesh size in the range of 150-200 μm in consideration of the efficiency of classification. The upper limit of the particle diameter is generally preferred to be 850 μm. If the particle diameter exceeds 850 μm, the excess will possible impair the sensation of use.

This invention has a characteristic feature in causing aggregates entrained by water-absorbent resin particles to be disintegrated after the aggregates have been separated from the water-absorbent resin particles by classification. The water-absorbent resin having a surface cross-linked layer has never been disintegrated hitherto in the belief that the disintegration exerts a physical load to bear on the water-absorbent resin and degrades the absorption property thereof. This invention, in consequence of a study aimed at elucidating the origin of aggregates and devising a method of disintegrating, has discovered the fact that the degradation of the absorption properties can be repressed by performing the disintegration under such conditions as enable the aggregates to be decomposed into primary particles. As a means to effect this disintegrating, it is commendable to adopt a knife cutter type disintegrating device adapted to admit a given object by spontaneous fall from above and disintegrate the object with a rotating knife during the fall thereof. Disintegrating device such as comminuter and flash mill is preferable to use. The conditions capable of decomposing aggregates into primary particles are fulfilled by properly setting the amount of aggregates to be supplied and the rotational speed of the knife cutter.

The product of the disintegration contains non-disintegrated coarse particles and fine powder so it is further treated in the same manner as the classification of the water-absorbent resin mentioned above to expel coarse particles and fine powder and the coarse particles are treated in the same manner as the disintegration of the aggregates mentioned above to expel coarse particles and fine powder in the products of the disintegration again. When this step of sizing is performed by a series of classification, disintegration, and another classification of the water-absorbent resin and/or the aggregates, the classification of aggregates mentioned above may be carried out simultaneously with the classification of the water-absorbent resin mentioned above. A preferred mode of disintegrating the aggregates mentioned above by the use of the knife cutter type disintegrating device is illustrated in FIG. 1.

The knife cutter type disintegrating device comprises a drive unit 10, a drum 20, a raw material supply port 30, a screen 40, a water-absorbent resin discharge port 50, a rotary shaft 70 rotated inside the drum 20 by the drive unit 10, and a knife cutter 60 joined to the rotary shaft 70. Heat treating unit 100 in FIG. 1 refers to a device for performing a surface cross-linking treatment on a water-absorbent resin precursor and forming a surface cross-linked layer in the precursor and cooling unit 200 refers to a device for cooling the water-absorbent resin having the surface cross-linked layer. The water-absorbent resin is classified to expel the aggregates and the fine powder of the water-absorbent resin and the obtained aggregates are subjected to the disintegration treatment.

The aggregates supplied to the raw material supply port 30 fall spontaneously toward the discharge port 50 and, during the fall, contact the knife cutter 60 being rotated in response to the rotation of the drive unit 10 and consequently are subjected to disintegration. The product of the disintegration can be passed through the screen 40 in the form of cylindrical by the centrifugal force exerted by the knife cutter 60 during the disintegration, then moved based on their own weight toward the discharge port 50, and finally discharged. Then, the products of the disintegration are classified by classification devise 300 in FIG. 1.

The screen 40 is disposed in the disintegrating device in order to prevent the undisintegrated aggregates from moving toward the product side. It can use a mesh size which is properly selected to suit the particle size aimed at. The residue stopped on the screen 40 may be introduced into the disintegrating device and disintegrated again.

In accordance with the knife cutter type disintegrating device, the water-absorbent resin is disintegrated by the interaction between the attracting force serving to induce vertical fall of the water-absorbent resin and the turning force generated by the knife cutter 60. The disintegration efficiency is variable with the strength of an object being disintegrated and the shear force involved. It is advisable to select such conditions that the disintegration may avoid forming fine powder very much or fracturing the surface cross-linked layer of the resin very much, finish the disintegration for short time, and establish continuous operation.

The disintegrating device to be used for this invention may be a vertical type or a horizontal type, whichever suits the occasion better.

The products of disintegration are dispersed from the rotary shaft 70 toward the screen 40 by the centrifugal force originating in the rotation of the knife cutter and then passed through the through holes formed in the screen 40. The speed of stirring which is capable of securing centrifugal force enough for the fragments of a particle size aimed at to pass the screen 40, disintegrating the aggregates into primary particles, and avoiding formation of fine powder by excessive disintegration falls in the range of 100-1000 rpm, particularly 300-700 rpm. If the speed of stirring falls short of 100 rpm, the shortage will prevent the disintegration will be performed insufficiently. If it exceeds 1000 rpm, the excess will result in forming fine powder in an unduly large amount. The products of disintegration are transferred from the disintegrating device to the classifying unit and subjected to the classifying treatment to remove coarse particles and fine powder.

Further, this invention is also capable of producing sized water-absorbent resin particles, which comprises, in particles of water-absorbent resin having a surface cross-linked layer produced by cross-linking on a surface of a water-absorbent resin precursor which is obtained by polymerizing at least an acrylic acid and a salt thereof and has an internal cross-linked structure in the precursor, a) a step of obtaining sized water-absorbent resin particles by disintegrating said water-absorbent resin particles, then removing non-disintegrated coarse particles and fine powder by classifying them, and b) a step of combining said sized water-absorbent resin particles of the step a) and a water-absorbent resin particles produced by disintegrating said coarse particles of step a) then removing non-disintegrated coarse particles and fine powder by classifying. This method constitutes the second aspect of this invention. The difference of the second aspect from the first aspect resides in the point that the aggregates arising from the surface cross-linking treatment are classified after they have undergone a disintegrating treatment. When the knife cutter type disintegrating device illustrated in FIG. 1 is used, the difference resides in the point that the water-absorbent resin is introduced in the place of the aggregates mentioned above into the raw material supplying port 30. The products of disintegration are subsequently classified to remove non-disintegrated coarse particles (aggregates) and fine powder and obtain a sized water-absorbent resin particles. Meanwhile, the coarse particles are disintegrated and classified again and then combined with the sized water-absorbent resin particles. It is preferable that the removed coarse particles are disintegrated with the water-absorbent resin treated by surface cross-linking and then classified. During the classification of the water-absorbent resin subsequent to the disintegration in the invention, the coarse particles and the fine power may be simultaneously removed or the coarse particles alone may be removed and the remaining water-absorbent resin may be pneumatically conveyed and then classified by the use of a shift or cyclone to remove the fine powder before it is introduced into the storage hopper.

That is, the object of disintegration may be the water-absorbent resin having a surface cross-linked layer, the aggregates of the water-absorbent resin, or the coarse particles obtained by disintegrating and classifying the aggregates mentioned above, whichever fit the occasion best. By performing at least once the classifying treatment of the products of the disintegration of the water-absorbent resin or the aggregates before or after the disintegration, it is made possible to obtain the water-absorbent resin having an optimum particle diameter in consequence of sizing. In respect of the fact that the disintegration by the use of the knife cutter type disintegrating device proves favorable, this invention may well be termed a method for sizing of a water-absorbent resin, which comprises disintegrating an aggregate generated by adhering particles of the water-absorbent resin having a surface cross-linked layer produced by cross-linking on a surface of the water-absorbent resin precursor which is obtained by polymerizing at least an acrylic acid and a salt thereof and has an internal cross-linked structure in the precursor with knife cutter type disintegrated device. In any event, by carrying out a step of disintegration of the water-absorbent resin, it is made possible to disintegrate the aggregates formed at the step of surface treatment into particles having a particle diameter proper for use. Then, by performing the step of classification, it is made possible to remove coarse particles and fine powder. Moreover, by setting for the step of disintegration of conditions optimum for the disintegration of the aggregates into primary particles, it is made possible to prevent the absorption properties of the water-absorbent resin from being degraded, preclude the formation of fine powder, and reduce the loss encountered in the disposal of useless remnant.

For the classification of the water-absorbent resin, the classification of the products of disintegrating the aggregates mentioned above, and the classification of the fragments obtained by disintegrating the products of the disintegration, the upper limit and the lower limit of the particle diameters obtained by disintegrating may be changed to suit the objects of disintegrating. The fine powder having a particle diameter not larger than 150 μm may be used as a water-stopping agent for cables. It may be reused by being mixed with a monomer solution or a polymer gel.

By sizing a water-absorbent resin in accordance with the method described above, it is made possible to confer an exalted absorption capacity under pressure on the produced water-absorbent resin and permit production of the water-absorbent resin destitute of coarse particles and fine powder. In this respect, the third aspect of this invention is directed toward a method for the production of a water-absorbent resin which comprises the aforementioned methods of the uniform granulation.

Now, the method of sizing and the method for production of a water-absorbent resin contemplated by this invention will be described in detail below.

(1) Preparation of Monomer Solution

The hydrated polymer subjected to surface cross-linking treatment in the invention is a carboxylic group-containing hydrated polymer which is obtained, for example, by polymerizing a hydrophilic unsaturated monomer such as acrylic acid and/or a salt thereof as a main component thereof. Any of the known polymers capable of forming a hydrophilic cross-linked polymer which is readily swollen but insoluble in water are usable as the hydrated polymer.

The hydrophilic cross-linked polymer is preferred to have a portion of the acid group in the cross-linked polymer falling in the range of 30 mol %-100 mol %, preferably 50 mol %-90 mol %, and particularly preferably 60 mol %-80 mol % neutralized with an alkali metal salt, an ammonium salt, or an amine salt, for example. This neutralization of the acid group may be performed preliminarily during the step of preparing a hydrophilic unsaturated monomer prior to the production of a hydrated polymer and the polymerization reaction may be started subsequently. The neutralization of the acid group of the cross-linked polymer may be performed either during the course of the polymerization or after the completion of the polymerization or on both the occasions mentioned. The hydrophilic unsaturated monomer mentioned above, when necessary, may contain an unsaturated monomer other than acrylic acid or salts thereof. As the hydrophilic unsaturated monomer and other monomer, the concrete examples enumerated in Paragraph "0040" in JP-A-2002-212204, for example, are available. When such other monomer is used, the amount of the other monomer to be used is properly not more than 30 mol %, more preferably not more than 10 mol %, based on the whole amount of the hydrophilic unsaturated monomer.

The hydrophilic cross-linked polymer mentioned above is preferred to have incorporated therein a cross-linked structure by using an internal cross-linking agent. The internal cross-linking agent mentioned above does not need to be particularly limited but is only required to be a compound containing in the molecular unit thereof a plurality of reactive groups capable of reacting with a polymerizable unsaturated group and/or a carboxyl group. The internal cross-linking agent is only required to be a compound possessing in the molecular unit thereof a plurality of substituent capable of copolymerizing with the hydrophilic unsaturated monomer and/or reacting with a carboxyl group. The hydrophilic unsaturated monomer may be formed of a self-cross-linking type compound which forms a cross-linked structure without use of any internal cross-linking agents.

As the internal cross-linking agent, the internal cross-linking agents enumerated in page 4 of JP-A-1998-182750 are available. These internal cross-linking agents may be used either singly or in the form of a combination of two or more members. By using the internal cross-linking agent possessing a plurality of polymerizable unsaturated groups in the molecular unit among other internal cross-linking agents mentioned above, it is made possible to enhance further the absorption properties of the produced water-absorbent resin. Then, the amount of the internal cross-linking agent to be used may be properly selected to suit properties of the water-absorbent resin aimed at. When a hydrated polymer is produced by polymerizing a hydrophilic unsaturated monomer, the reaction system may add hydrophilic polymers such as starch, a starch derivative, cellulose, a cellulose derivative, polyvinyl alcohol, polyacrylic acid (salts), and a cross-linked polyacrylic acid (salts); chain transfer agents such as hypoposphorous acid (salts); and water-soluble or water-dispersible surfactants.

(2) Polymerization

The method for polymerizing a monomer solution containing a hydrophilic unsaturated monomer does not need to be particularly limited. Various known methods such as, for example, aqueous solution polymerization, reversed-phase suspension polymerization, bulk polymerization, and sedimentation polymerization are available. Such reaction conditions as reaction temperature and reaction time do not need to be particularly restricted but may be properly selected to suit the composition of monomer components to be used. In the polymerization of a hydrophilic unsaturated monomer, therefore, any of the known polymerization initiators may be used. The polymerization initiators enumerated in Paragraph "0054" of JP-A-2002-212204, for example, may be used either singly or in the form of a combination of two or more members. The amount of the polymerization initiator to be used may be also selected properly to suit the polymerization temperature, etc.

The shape of the hydrated polymer obtained by the polymerization varies with the kind of method of polymerization to be used. It may be in the form of particles, ribbons, plates, and clay.

(3) Disintegration of Hydrated Polymer

The obtained hydrated polymer is disintegrated into small particles, preferable water content of the polymer for disintegration is 20-80 wt. %, more preferably 50-70 wt. %.

The disintegrating device may be properly selected to suit the water content of the hydrated polymer. A shearing type granulating device and a cutting shearing device are preferable to use as the disintegrating device of hydrated polymer above mentioned. Such devices include, saw, disc saw, band saw, vertical cutting mill (made by Orient K.KI.), rotoplex (made by Hosokawa Micron K.K.), turbo cutter (made by Turbo Kogyo K.K.), turbo grinder (made by Turbo Kogyo K.K.), tyre shredder (made by Masuno Seisakusho K.K.), rotary cutter mill (made by Yoshida Seisakusho K.K.), cutter mill (made by Tokyo Atomizer Seizo K.K.), shred crusher (made by Tokyo Atomizer Seizo K.K.), cutter mill (made by Masuko Sangyo K.K.), crusher (made by Masuko Sangyo K.K.), rotary cutter mill (made by Nara Kikai Seisakusho K.K.), Gainax crusher (made by Horai K.K.), U-COM (mady by Horai K.K.), mesh mill (made by Horai K.K.), and meat chopper.

This invention allows the polymerization to be effected in a twin-arm type kneader simultaneously with the disintegration of the gel.

The gel obtained by the disintegration of polymer gel is generally preferred to have a size of not more than 10 mm.

(4) Drying

The hydrated polymer obtained in the form of particles after the disintegration, namely the water-absorbent resin prior to the surface cross-linking treatment, may be dried. An ordinary drying device or heating furnace may be used for drying the water-absorbent resin. As concrete examples of the device used for the drying, a groove type stirring and drying device, a rotary drying device, a disc drying device, a fluidized-bed drying device, an air current drying device, and an infrared drying device may be cited. The dried water-absorbent resin thus obtained has a solid content generally in the range of 50-100 wt. % (water content 50-0 wt. %), preferably 85-100 wt. % (water content 15-0 wt. %), and most preferably 90-98 wt. % (water content 10-2 wt. %). Incidentally, the solid content is measured after drying it at 180° C. for three hours.

(5) Pulverization

The dried water-absorbent resin mentioned above may be pulverized by using a shaking mill, a roll granulater (Paragraph 0174 in JP-A-1997-235378), a knuckle type pulverizer, a roll mill (Paragraph 0069 in the official gazette of International Unexamined Patent Publication JP-2002-527547), high-speed rotary type pulverizer (pin mill, hammer mill, screw mill, and roll mill) (Paragraph 0036 in JP-A-1994-41319), or a cylindrical mixer (Paragraph 0008 in JP-A-1993-202199), for example.

(6) Classification

The product of the drying mentioned above may be used in an unmodified form as a water-absorbent resin. When necessary, it may be classified so as to be used as a sized water-absorbent resin comprising resin particles of prescribed particle size. The particle size in this case is properly not more than 2 mm and preferably falls in the range of 150 μm-850 μm. While the average particle diameter varies with the kind of use, it generally falls in the range of 100-1000 μm, preferably 150-800 μm, and more preferably 300-600 μm. The proportion of the particles which pass a sifter having a mesh size of 150 μm is preferably not more than 15 wt. %, more preferably not more than 10 wt. %, and still more preferably not more than 5 wt. %. The classification of this nature may be performed by virtue of vibration or by using an air current classifying device, for example.

The water-absorbent resin obtained as described above maybe in any of various forms such as sphere, scale, amorphous fragment, fiber, granule, rod, approximate sphere, and flat piece, for example.

As concrete examples of the water-absorbent resin prior to the surface cross-linkage other than the hydrophilic polymer mentioned above, the hydrolyzate of a starach-acrylonitrile graft polymer (JP-B-1974-43395), the product of neutralization of a starach-acrylic acid graft polymer (JP-A-1976-125468), the product of saponification of a vinyl acetate-acrylic ester copolymer (JP-A-1977-14689), the hydrolyzate of an acrylonitrile copolymer or an acrylamide copolymer (JP-B-1978-15959), the cross-linked products thereof, cross-linked polymers of polyacrylic acid such as the cross-linked products of partial neutralization of polyacrylic acid (JP-Al-1980-84304), and the water-absorbent resins disclosed in JP-A-1987-156102, JP-A-1993-112654, JP-A-1999-71424, JP-A-1992-214734, JP-A-1997-235378, JP-A-1999-349625, JP-A-2002-201290, International Unexsamined Patent Publication JP-2002-527547, and JP-A-2002-212204 may be cited. Any one may be used as a water-absorbent resin having a surface cross-linkage.

(7) Mixing of Surface Cross-Linking Agent

This invention causes the water-absorbent resin mentioned above, that is a water-absorbent resin precursor, to add an aqueous solution containing a surface cross-linking agent via a nozzle. The temperature of the water-absorbent resin precursor prior to the addition of the aqueous solution is adjusted preferably in the range of 80-35° C., more preferably 70-35° C., and still more preferably 50-35° C. After this temperature adjustment, the water-absorbent resin precursor is mixed with the aqueous solution. If the temperature of the water-absorbent resin precursor prior to the addition of the aqueous solution is unduly high, the aqueous solution will not be mixed uniformly. On the other hand, the adjustment of the temperature of below 35° C. will consume an unduly long time for cooling of the resin, cause the aggregation of the cooled resin and energy loss encountered in reheating the cooled water-absorbent resin.

The surface cross-linking agent to be used in this invention does not need to be particularly restricted but is only required to be a compound possessing in the molecular unit a plurality of functional groups capable of reacting with two or more carboxyl groups possessed by the water-absorbent resin precursor and consequently forming a covalent bond in consequence of a cross-linking reaction. As concrete examples of the surface cross-linking agent, polyhydric alcohols such as ethylene glycol, propylene glycol, glycerine, pentaerythritol, sorbitol, diethylene glycol, triethylene glycol, tetraethylene glycol, dipropylene glycol, tripropylene glycol, 1,3-butane diol, 1,4-butane diol, 1,3-pentane diol, 1,4-pentane diol, 1,5-pentane diol, 2,4-pentane diol, 1,6-hexane diol, 2,5-hexane diol, and trimethylol propane; polyvalent amine compounds such as diethanol amine, triethanol amine, ethylene diamine, diethylene triamine, and triethylene tetramine; polyvalent glycidyl compounds such as ethylene glycol diglycidyl ether, polyethylene glycol diglycidyl ether, glycerol polyglycidyl ether, diglycerol polyglycidyl ether, polyglycerol polyglycidyl ether, propylene glycol diglycidyl ether, and polypropylene glycol diglycidyl ether; and polyvalent azirdime compounds such as 2,4-trilene diisocyanate, ethylene carbonate (1,3-dioxolan-2-on), propylene carbonate (4-methyl-1,3-dioxolan-2-on), 4,5-dimethyl-1,3-dioxolan-2-on, (poly, di, or mono) 2-oxazolidinone, epichlorohydrin, epibromohydrin, diglycol silicate, 2,2-bishydroxymethyl butanol-tris[3-(1-azilidinyul) propionate] may be cited. The surface cross-linking agent does not need to be limited to these examples. These surface cross-linking agents may be used either singly or in the form of a combination of two or more members. Among other surface cross-linking agents enumerated above, at least one member selected from the group consisting of polyhydric alcohols, polyvalent glycidyl compounds, 1,3-dioxolan-2-on, poly-2-oxazolidinone, bis-2-oxazolidinone, and mono-2-oxazol-idinone proves particularly advantageous. The one surface cross-linking agent so selected is preferred to contain a polyhydric alcohol.

Though the amount of the surface cross-linking agent to be used varies with kinds of compounds to be used and their combination, it is proper in the range of 0.001-5 wt. parts, preferably 0.005-2 wt. parts, based on 100 wt. parts of the solid content of the water-absorbent resin precursor. If the amount of the surface cross-linking agent exceeds the upper limit of the range mentioned above, the excess will be at a disadvantage in not merely hurting economy but also giving rise to a useless surplus. Conversely, if this amount falls short of the lower limit of the range, the shortage will possibly render it difficult to obtain a surface cross-linked water-absorbent resin having a high absorption capacity under pressure.

For the purpose of solving the surface cross-linking agent, it is commendable to use water as the solvent. Though the amount of water to be used is variable with the kind of the water-absorbent resin precursor and the particle diameter thereof, it is preferably more than 0 and not more than 20 wt. parts and more preferably in the range of 0.5-10 wt. parts, based on 100 wt. parts of the solid content of the water-absorbent resin precursor.

During the mixing of the water-absorbent resin precursor and the surface cross-linking agent, a hydrophilic organic solvent may be used, when necessary, as the solvent. As concrete examples of the hydrophilic organic solvent mentioned above, lower alcohols such as methyl alcohol, ethyl alcohol, n-propyl alcohol, isopropyl alcohol, n-butyl alcohol, isobutyl alcohol, and t-butyl alcohol; ketones such as acetone; ethers such as dioxane, tetrahydrofuran and alkoxy polyethylene glycohol; amides such as N,N-dimethyl formamide; and sulfoxides such as dimethyl sulfoxide may be cited. The amount of the hydrophilic organic solvent to be used, though variable with the kind and the particle diameter of the water-absorbent resin precursor, is preferably in the range of 0-10 wt. parts, more preferably 0-5 wt. parts, and particularly preferably 0-1 wt. part, based on 100 wt. parts of the solid content of the water-absorbent resin precursor. In this invention, however, since the water-absorbent resin precursor and the surface cross-linking agent excel mixability, they can be homogeneously mixed without hydrophilic solvent.

The liquid temperature of the aqueous solution is preferable lower than the solid temperature of the water-absorbent resin precursor. Specifically, it is preferred to be not less than 10° C., more preferably not less than 20° C., and most preferably not less than 30° C. lower than the solid temperature of the water-absorbent resin precursor. Since the aqueous solution is sprayed through a nozzle, the temperature thereof ought to be not lower than the solidifying point thereof. If the liquid temperature of the aqueous solution is unduly high, the excess will be at a disadvantage in heightening the speed at which the water-absorbent resin precursor absorbs the ambient moisture and impeding the mixture from proceeding homogeneously.

The liquid drops of the aqueous solution are desired to have an average particle diameter smaller than that of the water-absorbent resin precursor. To be specific, it is preferably not more than 300 μm and more preferably not more than 250 μm. The maximum angle of spraying the aqueous solution through the nozzle is preferably not less than 500. The aqueous solution is preferred to be sprayed through the nozzle in the form of an empty cone so that the spray pattern may assume an annular shape as described in JP-A-2002-201290 or in the form of an elliptic cone so that the spray pattern may assume the shape of a biconvex lens. In this spraying method, the maximum preferred angle of spraying is not less than 50 degrees. If the angle of spraying falls short of 50 degrees, the shortage will possibly result in giving rise inside the mixing device filled with a dispersed mass of sprayed aqueous solution to a portion having the aqueous solution dispersed excessively and a portion having the aqueous solution dispersed at a low density and consequently biasing the state of mixture of the water-absorbent resin precursor and the aqueous solution. The maximum angle of spraying allowed by the nozzle is not more than 180 degrees on account of the construction of the nozzle.

Further, the area which is formed during the spraying of the aqueous solution through the nozzle at the prescribed angle mentioned above by the projection of the state of dispersion of the sprayed aqueous solution on the cross section lying perpendicularly to the direction of the axis of the mixing device and including the injecting point of the nozzle is preferably in the range of 70-100%, more preferably 80%-100%, and still more preferably 90-100%, of the cross section of the mixing device perpendicular to the direction of the axis thereof. If the cross section falls short of 70%, the shortage will be at a disadvantage in biasing the state of mixture of the water-absorbent resin precursor and the aqueous solution.

The mixing device may be having only one nozzle or with two or more nozzles. For the purpose of enlarging the area formed by projecting the state of dispersion of the sprayed solution on the cross section of the mixing device including the projecting point of the nozzle, the mixing device is preferred to have two or more nozzles. The mixing device to be used for mixing the water-absorbent resin precursor and the aqueous solution is preferred to be endowed with a large mixing force in order to ensure homogeneous and infallible mixture of the two components. The water-absorbent resin precursor is preferred to be kept stirred or fluidized with an air current.

As concrete examples of the mixing device to be advantageously used herein, a plowshare type mixing device, a cylindrical mixing device, a double-wall cone type mixing device, a V-shaped mixing device, a ribbon type mixing device, a screw type mixing device, a fluidized type rotary disc mixing device, an air current type mixing device, a twin-arm type kneader, an inner mixing device, a crushing type kneader, a rotary type mixing device, a screw type extruding device, a high-speed agitation type mixing device having a stirring shaft fitted with a plurality of paddles, and a blade type mixing device may be cited. The term "high-speed stirring and mixing device" as used herein refers to a mixing device which has a stirring shaft fitted with a plurality of paddles and adapts to generate a mixing force by the rotation of the stirring shaft at a rotational frequency falling generally in the range of 100 rpm-5000 rpm, preferably 200 rpm-4000 rpm, and more preferably 500 rpm-3000 rpm.

The mixing device mentioned above is preferred to have an inner wall which is adapted to form a contact angle of not less than 60 degrees with water for the purpose of preventing the mixture of the water-absorbent resin precursor and the aqueous solution from adhering thereto and inducing formation of aggregates and made of a medium having a temperature of thermal deformation exceeding 70° C. The medium may be selected from among the examples of medium enumerated in JP-A-1992-214734.

The temperature of the inner wall of the mixing device can be preferred to exceed the room temperature. To be specific, the temperature of the inner wall of the mixing device is kept not less than 40° C. and preferably between 50-100° C. Further, the temperature of the inner wall of the mixing device is preferably higher than that of the water-absorbent resin precursor. To be specific, this temperature difference is preferably not more than 40° C. and more preferably not more than 20° C. If the temperature of the inner wall of the mixing device falls short of the room temperature, the shortage will possibly induce the water-absorbent resin precursor mixture occurring during the mixture to adhere to the inner wall and form aggregates.

In this invention, the aqueous solution is allowed further to add a surfactant as a dispersing agent, particles for enhancing the effect of mixture, a metal complex as a denaturing agent, and an anti-fungus agent, a deodorant, a spice, a food additive, an oxidizing agent, a reducing agent, a chelating agent, an antioxidant, a radical inhibiting agent, and a pigment optionally solved or dispersed in a solvent and prepared in the form of an aqueous solution as additives in addition to the surface cross-linking agent. They may be added through a separate nozzle.

As the surfactant which is usable as a disaggregating agent, the nonionic, anionic, cationic, and amphoteric surfactants having an HLB value of not less than 3 which are described in International Unexamined Patent Publication JP-2002-527547 are available. This surfactant can be used in an amount in the range of 0-5 wt. % based on the weight of the water-absorbent resin precursor. As the particles, carbon black and other inorganic particles described in JP-A-1992-214734 are available. These particles can be used in an amount in the range of 0-10 wt. parts based on 100 wt. parts of the water-absorbent resin precursor. As the metal complex which is used as a denaturing agent, the divalent or polyvalent metal salt solutions described in the JP-2002-527547 are available.

The anti-fungus agent mentioned above does not need to be particularly restricted. It may be any of the hitherto known anti-fungus agents which possess the ability to resist fungi. The anti-fungus agents enumerated in JP-A-1999-267500 may be cited as concrete examples. The deodorant mentioned above does not need to be particularly restricted but may be any of the hitherto known deodorants which are capable of deodorizing such offensively smelling components of human urine as mercaptan, hydrogen sulfide, and ammonia. The extracts of the plants of family Camelliaceae which have flavanols and flavonols as deodorizing components may be cited as concrete examples. Though the amount of an additive to be added for the purpose of conferring an additive function on the water-absorbent resin may be properly varied to suit the purpose of addition and the kind of additive, it preferably falls in the range of 0.001-10 wt. parts, more preferably 0.01-5 wt. parts, and still more preferably 0.05-1 wt. part, based on 100 wt. parts of the water-absorbent resin.

The water-absorbent resin precursor and the aqueous solution are thrown in the mixing device and mixed therein under the conditions mentioned above. The mixing time falls preferably in the range of one second-ten minutes and more preferably five seconds-five minutes.

(8) Heating Treatment

The mixture of the water-absorbent resin precursor and the surface cross-linking agent obtained as described above can be subjected even at room temperature to surface cross-linkage. It is preferably heated, however, for the purpose of promoting the reaction and enabling the added water and solvent to be removed. The heating can be carried out while the mixture is left at rest or kept in a stirred state. When the heating is carried out while the mixture is being stirred, the mixture may be heated in the mixing device till the surface cross-linkage is completed. To be specific, the mixture may be placed in a biaxial groove type stirring and drying device, for example, and heated therein till the surface cross-linkage is completed. The heat treatment mentioned above is carried out with the temperature of the mixture of the water-absorbent resin precursor and the surface cross-linking agent-containing aqueous solution kept preferably in the range of 60° C.-250° C., more preferably 80° C.-250° C., still more preferably 100° C.-230° C., and particularly preferably 150° C.-200° C., though depending on the kind of surface cross-linking agent to be used. If the treating temperature falls short of 60° C., the shortage will possibly result in disabling formation of a uniformly cross-linked structure and obstructing production of a surface cross-linked water-absorbent resin having a high absorption capacity under pressure. Moreover, this shortage will add to the time required for the heat treatment and induce a decrease in productivity. If the treating temperature exceeds 250° C., the excess will be at a disadvantage in inducing deterioration of the water-absorbent resin and consequently degrading the properties of the surface cross-linked water-absorbent resin.

As the carrier gas for supplying the water-absorbent resin to the groove type stirring and drying device under the conditions described above, steam, air, and nitrogen gas are available. The amount of the water-absorbent resin precursor to be supplied is properly decided. The gas for adjusting the temperature and the dew point may be properly decompressed or pressed or properly heated or cooled. It is generally proper that the air kept in the neighborhood of room temperature (such as, for example, 0-50° C.) be supplied under substantially normal pressure ($1.013 \times 10^5$ Pa (1 atmosphere) ±10%, preferably ±5%, and more preferably ±1%).

In this invention, when the water-absorbent resin precursor is heated with the paddle built in the groove type stirring and drying device, the water-absorbent resin precursor is heated by the heat transfer surface (paddle) heated with a thermal medium and, at the same time, the empty space above the water-absorbent resin precursor which is not contiguous with the heat transfer surface may be controlled at a prescribed temperature and a prescribed dew point. During the removal of the water and the solvent, the individual particles of the water-absorbent resin precursor tend to adhere. This adhesion is unavoidable even when the heating is performed while the mixture is kept stirred and is particularly conspicuous in the case of a commercial production.

(9) Cooling

The water-absorbent resin which has been heated for the surface cross-linking treatment is preferred to be cooled before it is pulverized and disintegrated. The cooling device is not restricted. The cooling is performed, for example, in a biaxial stirring and drying device which is cooled with the water kept at 35° C. by means of an inner wall or other heat transfer surface.

(10) Disintegration and Classification

The cooled water-absorbent resin contains aggregates having a larger particle diameter than the prescribed particle diameter in spite of the adjustment of particle diameter by the pulverization and classification mentioned above. It possibly contains fine powder. This is because aggregates are formed when the surface cross-linking agent is mixed or when the surface cross-linking reaction is performed. When the surface cross-linking reaction is performed while the mixture is being stirred or when the mixture is cooled while it is being stirred, the surfaces of the water-absorbent resin particles are shaved to generate fine powder thereof. The water-absorbent resin containing the aggregates is subjected to disintegrating and classification. It is no matter which action precedes. When the classifying treatment is performed to remove the aggregates and the fine powder contained in the water-absorbent resin, for example, the classification is executed by the use of such a classifying means as a shaking sifter or an air current classifying device. When the water-absorbent resin is sized so as to fit application to such hygienic products as a disposable diaper and a sanitary article, the classification is performed with sieves having mesh sizes of 850 µm and 150 µm. The particles which pass the sieve of 150 µm are removed and those which remain on the sieve of 850 µm are supplied to a disintegrating device with knife cutter illustrated in FIG. 1 and disintegrates therein at a rotational frequency in the range of 300-700 rpm.

The products of the disintegration are classified with sieves having mesh sizes of 850 µm and 150 µm to remove the particles passing the sieve of 150 µm and those remaining on the sieve of 850 µm. Thus, the water-absorbent resin formed of particles having particle diameters of 150-850 µm can be obtained.

(11) Water-Absorbent Resin Product

The water-absorbent resin resulting from the sizing is transferred onto a hopper by pneumatic conveyance, for example, and filled in storage packs. The sized water-absorbent resin particles deprived of fine powder by classification are caused during the pneumatic conveyance to form fine powder anew or additionally in consequence of mechanical attrition. In this invention, the water-absorbent resin entraining the fine powder is classified with a sifter or a cyclone during the course of the pneumatic conveyance or immediately prior to the introduction into the hopper to remove the fine powder.

The water-absorbent resin produced by this invention is found by the method of determination adopted in the following working examples to possess an absorption capacity in the range of 10-60 g/g, preferably 20-55 g/g, and more preferably 25-50 g/g. Further, this water-absorbent resin is found by the method of determination adopted in the following working examples to manifest a absorption capacity under pressure of not less than 10 g/g, preferably not less than 15 g/g, and more preferably not less than 20 g/g. Therefore, the water-absorbent resin obtained by the invention can be used as an absorbing agent also.

EXAMPLES

Now, this invention will be described more specifically below with reference to working examples and comparative examples.

Example 1

In a kneader provided with two sigma type blades, an aqueous monomer solution comprising sodium acrylate, acrylic acid, and water and having a monomer concentration of 38 wt. % and a neutralization ratio of 75 mol % was prepared and polyethylene glycol diacrylate (having an average ethylene glycol unit number: 9) was dissolved as an internal cross-linking agent in the aqueous monomer solution till a concentration of 0.03 mol % (relative to the monomer). Then, nitrogen gas was blown into the aqueous monomer solution so as to lower the dissolved oxygen in the aqueous monomer solution and, at the same time, displace the whole interior of the reactor with nitrogen. Subsequently, sodium persulfate and L-ascorbic acid were added each as a polymerization initiator till respective concentrations of 0.12 g/mol (relative to the monomer) and 0.005 g/mol (relative to the monomer) while the two sigma type blades were kept in rotation. When the polymerization temperature reached 50° C., the blade was again set rotating to continue the polymerization in the kneader. After the polymerization was continued for about 50 minutes, a hydrated polymer having an average particle diameter of about 2 mm was obtained.

The hydrated polymer thus obtained was dried with a hot air drier at 170° C. for about 60 minutes. Then, the dried polymer was pulverized with a roll mill pulverizer and classified with sieves having mesh sizes of 850 µm and 180 µm to obtain a water-absorbent resin precursor (1) having a water content of 3 wt. % and an average particle diameter of 390 µm. The precursor (1) was found to contain 1 wt. % of fine powder having a particle diameter of 150 µm.

In a continuous high-speed stirring and mixing device (made by Hosokawa Micron K.K. and sold under the trademark designation of "Turburizer"), 100 wt. parts of the water-absorbent resin precursor (1) and 3.23 wt. parts of a surface cross-linking agent composed of ethylene glycol diglycidyl ether:propylene glycol:water=0.03:0.5:2.7 were spray mixed.

The mixture of the water-absorbent resin precursor (1) and the surface cross-linking agent was continuously heated in a biaxial stirring and drying device introducing heated steam to the inner wall, stirring plate, and rotar shaft thereof and having a surface temperature of 190° C. The average retention time was 60 minutes. The heated water-absorbent resin (1) now having a surface cross-linked layer was cooled in a biaxial stirring and drying device having the inner wall, stirring plate, and rotary shaft continuously swept with water of 35° C. The average retention time was 30 minutes.

The cooled water-absorbent resin (1) was introduced into a disintegrating device shown in FIG. 1 and then classified with sieves having mesh sizes of 850 µm and 150 µm. The particles retained on the sieve of 850 µm were disintegrated again by the disintegrating device. The particles which had passed the sieve of 150 µm were separated. The water-absorbent resin (1) which had passed the sieve of 850 µm and had not passed the sieve of 150 µm was transferred by pneumatic conveyor to a hopper and used in filling packs to become a finished product (1).

The product (1) was found to have the absorption capacity of 36 (g/g) and the absorption capacity under pressure of 24 (g/g) and contain 0.5% of fine powder having particle diameters of not more than 150 µm. The particles which had particle diameters exceeding 850 µm after the repeated disintegrating were disintegrated again with the disintegrating device.

The absorption capacity was determined by keeping a given sample in an aqueous 0.90 wt. % physiological saline solution for 30 minutes under no pressure and the absorption capacity under pressure was determined by keeping a given sample in an aqueous 0.90 wt. % physiological saline solution under a pressure of 4.83 kPa for 60 minutes. These determinations were carried out as follows.

(1) Absorption capacity: Under the conditions of room temperature (20-25° C.) and humidity of 50 RH %, 0.20 g of a given water-absorbent resin powder uniformly placed in a pouch of non-woven fabric (60 mm×60 mm) and sealed therein was immersed in an aqueous 0.9 wt. % physiological saline solution at room temperature. The pouch was pulled out of the solution after standing at rest for 30 minutes therein, drained by the use of a centrifugal separator (made by Kokusan-Sha K.K. and sold under the product code of "Type H-122") at 250 G for three minutes and subsequently measured for the weight $W_1$ (g). The same procedure was repeated on the pouch containing neither the water-absorbent resin nor an absorbing agent to find the weight $W_0$ (g).

The absorption capacity (g/g) was calculated in accordance with the following formula using $W_1$ and $W_0$.

Absorption capacity $(g/g) = (W_1 (g) - W_0 (g))$/the weight of water-absorbent resin $(g)$ Where the water-absorbent resin means an absorbing agent comprising the water-absorbent resin as a main component, the absorption capacity is calculated using weight of the absorbing agent instead of the weight of water-absorbent resin.

(2) Absorption capacity under pressure: A 400-mesh wire gauze made of stainless steel (having a mesh size of 38 μm) was fused to the bottom of a plastic supporting cylinder having an inside diameter of 60 mm. Under the conditions of room temperature (20-25° C.) and humidity of 50 RH %, 0.90 g of a water-absorbent resin was uniformly scattered on the wire gauze, a piston adjusted to exert a load of 4.83 kPa (0.7 psi) on the absorbing agent and having an outside diameter slightly smaller than 60 mm to as to avoid forming a gap between itself and the supporting cylinder and produce an unobstructed vertical motion and a load were mounted on the water-absorbent resin sequentially in the order mentioned. The weight Wa (g) of the whole system of this measuring device was measured.

A glass filter having a diameter of 90 mm (pore diameter: 100-120 μm; made by Sougo Rikagaku Glass K.K.) was placed inside a petri dish having a diameter of 150 mm and an aqueous 0.90 wt. % pysiological saline solution (20-25° C.) was added to the petri dish to reach a level flush with the upper surface of the glass filter. One filter paper 90 mm in diameter (having a thickness of 0.26 mm and a retaining particle diameter of 5 μm; made by Advantec Toyo K.K. and sold under the product code of "JIS P 3801, No. 2") was placed thereon to wet the entire surface thereof, with the excess liquid removed from the surface.

The whole system of the measuring device mentioned above was placed on the wet filter paper and allowed to absorb the liquid under the load. After the elapse of one hour thence, the whole system of the measuring device was pulled up and the weight Wb (g) thereof was measured. The absorption capacity under pressure (g/g) was calculated in accordance with the following formula using Wa and wb.

Absorption Capacity Under Pressure $(g/g) = (Wa (g) - Wb (g))$/Weight of the water-absorbent resin $(0.9 g)$ Where the water-absorbent resin means an absorbing agent comprising the water-absorbent resin as a main component, the absorption capacity under pressure is calculated using weight of the absorbing agent instead of the weight of water-absorbent resin.

Example 2

The cooled water-absorbent resin (1) obtained in Example 1 was classified with sieves having mesh sizes of 850 μm and 150 μm. The water-absorbent resin which had not passed the sieve of 150 μm was transferred by pneumatic conveyance to a hopper and used therein to fill packs and obtain a product (2).

The water-absorbent resin which had not passed the sieve of 850 μm was introduced into the disintegrating device and then classified again with sieves of mesh sizes of 850 μm and 150 μm. The water-absorbent resin which had passed the sieve of 150 μm was removed.

The product (2) was found to have the absorption capacity of 36 (g/g) and the absorption capacity under pressure of 25 (g/g) and contain 0.3% of fine powder having particle diameters of not more than 150 μm.

Comparative Example 1

The water-absorbent resin disintegrated with a disintegrating device in Example 1 was classified with a sieve having a mesh size of 850 μm. The fragments retained on the sieve were disintegrated again with the disintegrating device. The water-absorbent resin which had passed the sieve of 850 μm was transferred by pneumatic conveyance to a hopper and used to fill packs and produce a product for comparison (1).

The product for comparison (1) was found to have the absorption capacity of 36 (g/g) and the absorption capacity under pressure of 23 (g/g) and contain 3% of fine powder having particle diameters of not more than 150 μm. Unlike the product (1) of Example 2, the product for comparison (1) was liable to induce segregation within the holler.

Comparative Example 2

The water-absorbent resin cooled and the water-absorbent resin disintegrated in example 2 were each classified with a sieve having a mesh size of 850 μm. The fragments retained on the sieve were disintegrated again with the disintegrating device. The water-absorbent resin which had passed the sieve of 850 μm was transferred by pneumatic conveyance to a holler and used therein to fill packs and obtain a product for comparison (2).

The product for comparison (2) was found to have the absorption capacity of 36 (g/g) and the absorption capacity under pressure of 24 (g/g) and contain 2% of fine powder having particle diameters of not more than 150 μm.

Example 3

The pneumatically conveyed water-absorbent resin in Comparative Example 2 was classified with a sieve of 150 μm immediately before it was introduced into the hopper. The fragments retained on the sieve were placed in the hopper and used therein to fill packs and obtain a product (3). The fine powder which had passed the sieve was removed.

The product (3) was found to have the absorption capacity of 30 (g/g) and the absorption capacity under pressure of 24 (g/g) and contain 0.1% of fine powder having particle diameters of not more than 150 μm. While the product for comparison (2) formed fine powder during the course of pneumatic conveyance, the product (3) formed fine powder in a smaller amount than the product for comparison (2) because it was classified after the pneumatic conveyance to remove the fine powder.

The invention claimed is:

1. A method for sizing a water-absorbent resin comprising:
   a) polymerizing at least an acrylic acid or a salt thereof to obtain a water-absorbent resin precursor having an internal cross-linked structure, cross-linking the surface of the resin precursor to obtain surface cross-linked water-absorbent resin particles, and classifying the water-absorbent resin particles and removing aggregates or non-disintegrated coarse particles and fine powder to obtain first sized water-absorbent resin particles, and
   b) disintegrating aggregates or non-disintegrated coarse particles acquired in step a), classifying the disintegrated product and removing non-disintegrated coarse particles and fine powder, if any, to obtain second sized water-absorbent resin particles, and combining the first sized water-absorbent resin particles obtained from step a) and the second sized water-absorbent resin particles.

2. A method according to claim 1, wherein said disintegration is executed with a knife cutter type disintegrating device.

3. A method for production of a water-absorbent resin, comprising a method of sizing of claim 1.

4. A method according to claim 1, wherein the particle diameter used for the classification of step a) is 100-850 μm.

5. A method according to claim 1, wherein the average particle diameter of said water-absorbent resin precursor is 300-600 μm, and the proportion of said water-absorbent resin precursor particles which pass a sifter having a mesh size of 150 μm is not more than 5 wt. %.

6. A method according to claim 1, wherein the surface cross-linking agent used in the cross-linking is at least one member selected from the group consisting of polyhydric alcohols, polyvalent glycidyl compounds, 1,3-dioxolan-2-on, poly-2-oxazolidinone, bis-2-oxazolidinone, and mono-2-oxazol-idinone, and the amount of said surface cross-linking agent is 0.001-5 wt. parts, based on 100 wt. parts of solid content of said water-absorbent resin precursor.

7. A method according to claim 6, wherein said surface cross-linking agent comprises polyhydric alcohol.

8. A method according to claim 1, wherein said surface cross-linking agent is dissolved in water of 0.5-10 wt. parts, based on 100 wt. parts of solid content of said water-absorbent resin precursor.

9. A method according to claim 1, wherein said sized water-absorbent resin of the step b) has absorption capacity in an aqueous 0.90 wt. % physiological saline solution of 25-50 g/g, and absorption capacity under pressure of not less than 20 g/g.

10. A method according to claim 1, wherein the solid content of said water-absorbent resin precursor is 90-98 wt. %.

* * * * *